Dec. 10, 1957  G. H. SCHANZ  2,815,520
TIRE TREAD STOCK BUFFING APPARATUS
Filed Sept. 28, 1954  3 Sheets-Sheet 1

INVENTOR.
GEORGE H. SCHANZ
BY W. A. Shira Jr.
ATTY.

Dec. 10, 1957  G. H. SCHANZ  2,815,520
TIRE TREAD STOCK BUFFING APPARATUS
Filed Sept. 28, 1954  3 Sheets-Sheet 3
FIG-3
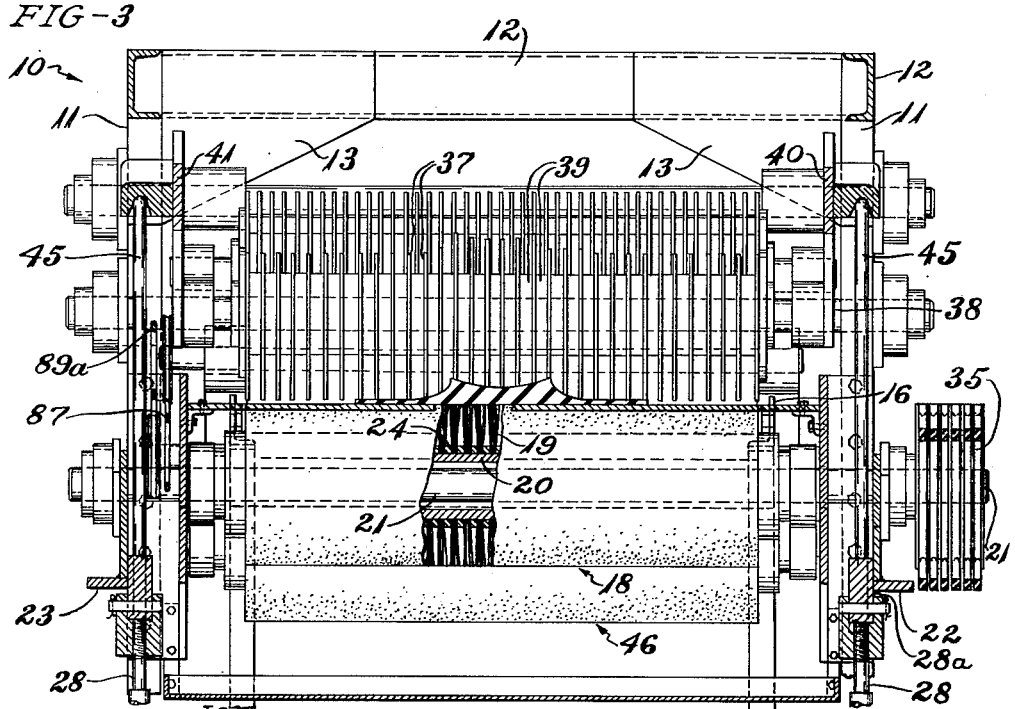
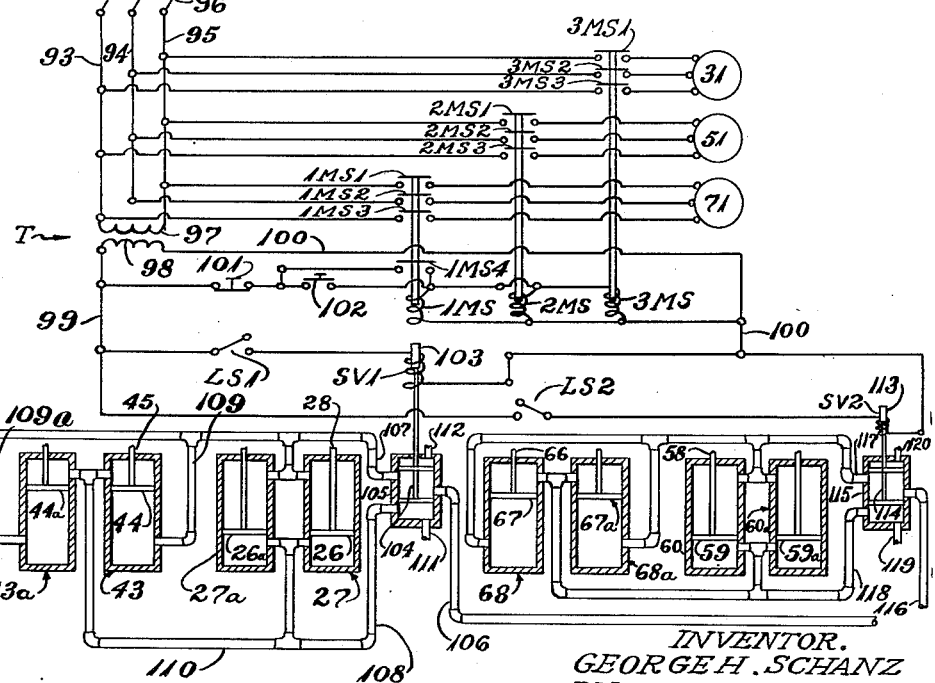
FIG-4
INVENTOR.
GEORGE H. SCHANZ
BY W. A. Shira Jr.
ATTY.

United States Patent Office 2,815,520
Patented Dec. 10, 1957

2,815,520

TIRE TREAD STOCK BUFFING APPARATUS

George H. Schanz, Akron, Ohio, assignor to The B. F. Goodrich Company, New York, N. Y., a corporation of New York Application September 28, 1954, Serial No. 458,790

10 Claims. (Cl. 15—40)

This invention relates to a buffing or brushing apparatus and, more particularly, to an apparatus for buffing or brushing the surface of tread stock for vehicle tires.

Vehicle tires are customarily produced by applying a layer or slab of a rubber composition, called tread stock, over a carcass formed of rubber coated cords after which the tire is cured and the tread pattern formed in the tread stock by heating and expanding the tire in a suitable mold. Good adherence of the tread stock to the carcass is essential to the production of a satisfactory tire and this adherence is facilitated if the surface of the tread stock applied to the carcass is roughened and has not been exposed to the air for an unduly long period of time prior to the application of the stock to the carcass. Where the tires to be formed are of large size, however, such as employed on trucks, earth moving equipment, aircraft or the like, it is expedient to form the slabs of tread stock somewhat in advance of the time when such slabs are to be utilized, the carcass-engaging surface then being buffed or strongly brushed just prior to application of the stock to the carcass. Heretofore, this has been accomplished by utilizing small portable buffing or brushing wheels of the hand type. This has not only been time-consuming and hence expensive but also has frequently resulted in non-uniform preparation of the surface so that adherence to the carcass has not been consistently good in all areas of the tread stock.

An object of this invention is to provide an improved apparatus for brushing or buffing tread stock such that the entire length of the stock can be uniformly buffed or brushed in one continuous operation in a fraction of the time required heretofor and with less handling and injury to the stock.

Another object of the invention is to provide an improved brushing or buffing apparatus for tread stock such that the leading and trailing end portions of the stock passing through the apparatus are as uniformly and effectively brushed or buffed as are the other areas.

Another object of the invention is to provide an improved apparatus as defined above wherein the buffing or brushing operation is automatically initiated in response to movement of the tread stock to a location adjacent to the buffing or brushing means.

A further object of the invention is to provide an improved apparatus as defined above wherein the buffing or brushing operation is initiated by movement of a brush means into cooperation with the tread stock in response to positioning of the latter in a location adjacent the said brush means.

A more specific object of the invention is to provide an improved buffing or brushing means for tire tread stock wherein two rotatable brush means, rotating in opposite directions, are sequentially engaged with the tread stock to insure brushing or buffing of the entire length of the stock during movement of the latter transversely of the axis of the rotation of the brush means.

The invention further resides in certain novel features of the construction and arrangements of parts of the apparatus, and further objects and advantages of the invention will be apparent to those skilled in the art to which the invention pertains from the following description taken in conjunction with the accompanying drawings, forming a part of this application, and in which.

Figure 1:
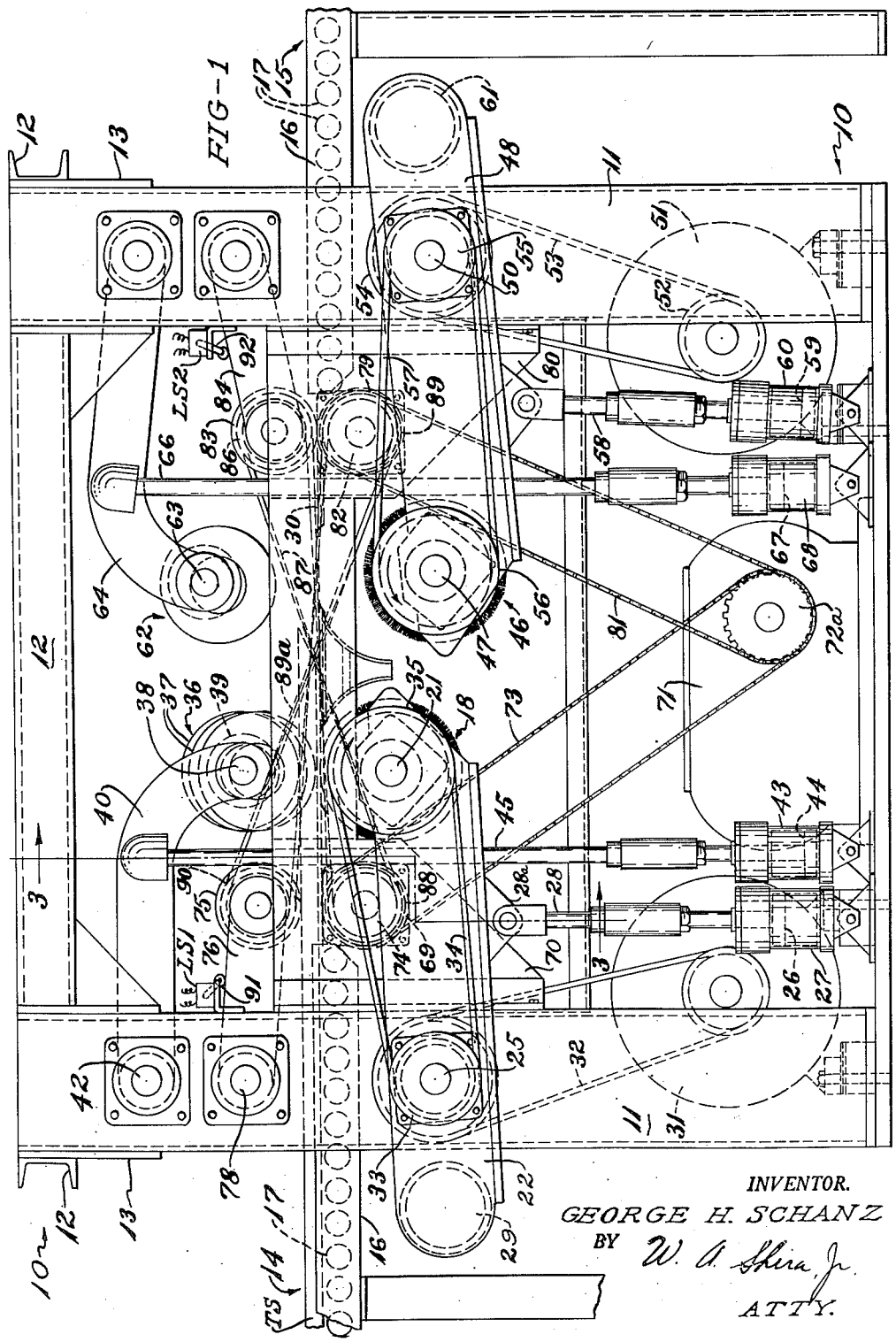
Fig. 1 is a side elevational view of the presently preferred apparatus embodying the invention.

Fig. 3 is a fragmentary transverse sectional view taken substantially on the irregular section indicating line 3—3 of Fig. 1 and showing a portion of the tread stock being buffed or brushed, a portion of the buffing or brushing means being shown in section to more clearly illustrate its construction; and Fig. 4 is a schematic representation of the electrical and fluid pressure operated mechanism controlling operation of the apparatus.

The illustrated form of the apparatus embodying the invention comprises a frame, generally designated 10, formed of suitable angle, channel and plate members welded and/or bolted together. This frame includes two sets of horizontally spaced, vertically extending posts or pillars 11 located at the corners of the apparatus with the upper and lower ends of these posts or pillars interconnected by suitable structural members, such as channels 12, plates 13 and the like, in a manner which is readily apparent to those skilled in the designing and construction of machine frames. Extending between the two sets of posts or pillars 11 at either end of the machine are supporting means 14 and 15 for the tire tread stock which is to be operated upon. Each of these supporting means comprise a pair of spaced channels or other frame members 16 which rotatably support a plurality of rollers 17 in parallel relationship with their axes extending horizontally.

The inner ends of the tread stock supporting means 14 and 15 terminate in spaced relationship with respect to each other and the brushing or buffing mechanism which engages the stock is located therebetween. This mechanism comprises a first elongated rotatable buffing or brushing means 18, the axis of which extends horizontally and transversely of the direction of movement of tread stock resting upon and passing over the supporting means 14 and 15. In the presently preferred form, this buffing means comprises a plurality of annular brush members 19, see Fig. 3, supported upon a hollow tube 20 which, in turn, is supported upon and connected with a shaft 21 that has its outer ends journaled in a pair of pivoted arm members 22 and 23. The several annular brush members 19 are axially spaced by suitable ring or collar members 24. The collar members 24 and brush members 19 are axially clamped together and connected with the sleeve or tube 20, which in turn is connected with the shaft 21, in a manner which is well known in the art of machine manufacture and hence need not here be illustrated and described in detail. It is sufficient here to note that, when the shaft 21 is rotated, the brush members 19 likewise are rotated and can effect a buffing or brushing action upon an article engaged therewith.

As mentioned heretofore, the ends of the shaft 21 of the buffing or brushing means 18 are journaled in spaced arms 22 and 23. These arms are pivotally connected to the adjacent pillar or post members 11 by means of a transversely extending shaft 25 which is rotatably supported in the said post or pillars. The arms, and hence the buffing or brushing means 18, are adapted to be rocked from a lower position, in which no buffing or brushing action is performed, to an upper or operative position, as indicated in Fig. 1, in response to the presentation of tread stock adjacent thereto. In the illustrated embodiment this movement of the arms and of the buffing or brushing means 18 is effected by fluid pressure actuated mechanism comprising pistons 26 and 26a, operable, respectively, in cylinders 27 and 27a supported upon the frame. These pistons are each connected to an adjustable length thrust member 28, and the upper end of each of the latter is pivotally connected to a bracket, such as 28a, on the associated arm. The rear ends of the arms 22 and 23 are preferably provided with counterweight means 29 which interconnects the arms and partially counterbalances the weight of the brushing or buffing means 18 but does not prevent the latter from assuming the lower or inoperative position when tread stock is not passing adjacent thereto.

As hereinafter described in detail, the approach of a piece of tread stock TS to the vicinity of the brushing or buffing means 18 actuates mechanism which supplies fluid pressure to the cylinders 27 and 27a in a direction which elevates the pistons 26 and 26a thereby moving the buffing or brushing means 18 to the upper or operative position as indicated in Fig. 1. In this position, the buffing or brushing means 18 engages the lower surface of a slab of tread stock TS through an opening in a horizontally extending table-like portion 30 of the frame which extends intermediate the inner ends of the roller supports 14 and 15 and provides a supporting surface for the tread stock while the latter is moving through the apparatus.

Figure 2:
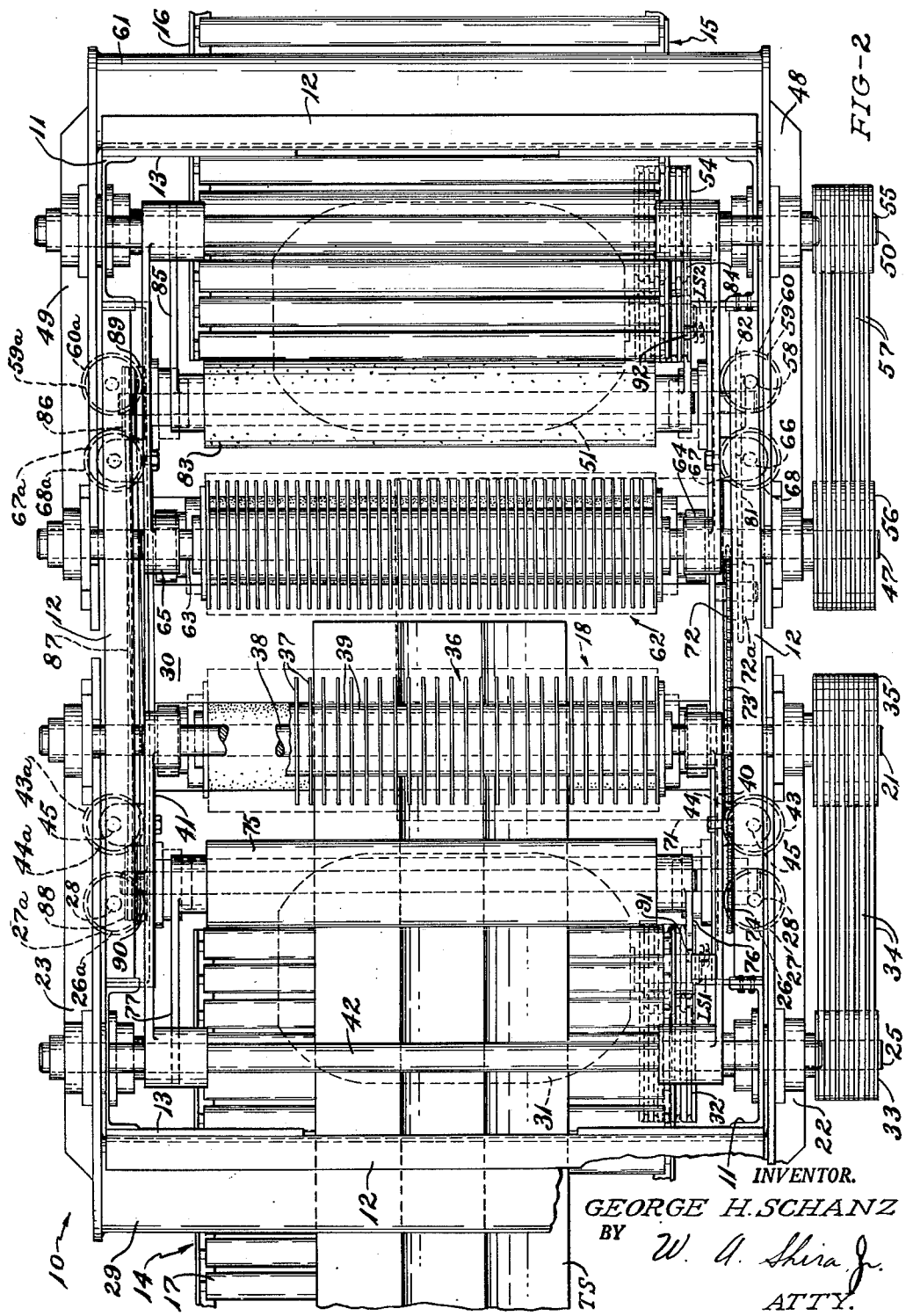
Fig. 2 is a top elevational view of the apparatus shown in Fig. 1 with a portion of one of the stock engaging means broken away to more clearly illustrate its construction and location relative to the cooperating brushing means.

Power for effecting rotation of the buffing or brushing means is supplied by an electric motor 31, the shaft of which is connected to the shaft 25 by a flexible drive 32 comprising multiple V-belts extending about pulleys provided upon the motor shaft and shaft 25 respectively, see Figs. 1 and 2. Shaft 25 is also provided with a multiple groove pulley assembly 33 that serves as the driving element for a multiple V-belt drive 34, the driven element of which is provided by multiple groove pulley 35 connected with the shaft 21 of the buffing or brushing means 18. Hence, energization of the motor 31 effects rotation of the buffing or brushing means 18.

Above and in vertical alignment with the buffing or brushing means 18 is a tread stock engaging assembly 36 which is adapted to be moved from an elevated, non-operative position to a position in which it engages the upper surface of the tread stock and holds the lower surface of the latter in contact with the buffing or brushing means 18 during a buffing operation. In view of the fact that the upper or outer surface of the tread stock TS is frequently provided with a configuration which is not planar, this stock engaging means 36 is so constructed that it may conform with the configuration of the upper surface of the tread stock without injury to, or alteration of, the shape of the latter. For this purpose the engaging means 36 is preferably constructed of a plurality of individually radially movable members such as annular disk-like elements 37 which each have an enlarged circular opening through which passes a supporting rod or shaft 38. The disks 37 are axially spaced from each other and held in proper vertical relationship by ring-like members or collars 39 supported upon the shaft 38 in alternation with the disks, the collars and disks being so related that the latter can individually move radially relative to the shaft 38 without departure from a vertical plane. Hence, when the assembly 36 is allowed to engage and rest upon the upper surface of the tread stock TS, those disks 37 which rest upon surfaces of different elevation shift radially to conform therewith, as is clearly shown in Fig. 3, while the weight of the assembly serves to hold the portion of the tread stock adjacent the buffing or brushing means 18 in engagement with the latter.

Movement of the assembly 36 to the aforementioned operative position is made possible by having the ends of the shaft 38 movably supported upon the frame. As here shown, this is effected by supporting the shaft 38 by a pair of arm members 40, 41 which are pivotally connected to the posts or pillars 11 by a shaft 42 extending transversely of the posts or pillars at a location vertically above the shaft 25. Actuation of the arms 40 and 41, and hence the assembly 36, to and from operative position with respect to the tread stock TS is effected by fluid pressure operated mechanism comprising cylinders 43, 43a in which pistons 44, 44a respectively move in response to application of fluid pressure. The piston 44 is connected with an adjustable length thrust member 45, the upper end of which is received in a socket on the arm 40. A similar thrust member connects the piston 44a to the arm member 41. The construction is such that, when tread stock is adjacent the buffing means 18, the application of fluid pressure to the cylinders 43 and 43a is controlled, as hereinafter described, in a manner causing the pistons 44 and 44a to move downwardly so that the assembly 36 is lowered into contact with tread stock at the same time that the buffing means 18 is elevated to operative position. When the tread stock has passed therebeyond, the assembly 36 is elevated and the buffing means 18 is simultaneously lowered to the non-operative positions.

The apparatus also includes a second buffing or brushing means, indicated generally by numeral 46, which is provided for the purpose of insuring that the entire length of the tread stock will be buffed or brushed without buckling or injury to the stock. The second buffing or brushing means 46 is constructed in the same manner as the buffing or brushing means 18 and hence the details thereof need not be recited here. Suffice it to note that the buffing or brushing means 46 is in the nature of an elongated rotary brush, the shaft 47 of which is rotatably supported by spaced arms 48 and 49 adjacent the ends thereof. These arms are pivotally supported on the machine frame 10 by being rockably mounted on a shaft 50 which is rotatably supported on the pair of posts or pillars 11 located at the opposite end of the machine from the posts or pillars which support the brushing means 18.

Power for rotating the brushing means 46 is provided by a motor 51 the shaft of which is provided with a multiple groove pulley 52 about which passes a flexible power transmitting means such as a plurality of V-belts 53. The belts 53 pass about a pulley 54 connected upon the shaft 50 and this shaft is also provided with a pulley 55 that is interconnected with a pulley 56 on the brush shaft 47 by means of a plurality of V-belts 57. It will be apparent from the construction just described that energization of the motor 51 rotates the shaft 50 and this in turn acts through the belts 57 to rotate the buffing or brushing means 46.

The brushing means 46 is adapted to be moved from its non-operative position indicated in Fig. 1 to its operating position, wherein it engages the tread stock through an opening in the table-like portion 30 of the frame, by fluid pressure operating means in a manner similar to that previously described for operation of brushing means 18. For this purpose, the arms 48 and 49 are each pivotally connected with an adjustable thrust member such as 58, the lower ends of which members are connected, respectively, to pistons 59 and 59a acting in cylinders 60 and 60a, see Figs. 1 and 4. In the position shown for the brushing means 46 in Fig. 1, the pistons 59 and 59a are each disposed in the lower portion of the respective cylinders. However, these pistons are elevated to bring the brushing means into operative position by application of fluid pressure as is hereinafter described. The weight of the arms 48 and 49 together with the weight of the brushing means 46 is preferably counterbalanced, at least in part, by means of a weight member 61 attached to the arms at the ends thereof opposite those ends which support the brushing means.

The apparatus is also provided with a means for engaging the upper surface of the tire tread stock to maintain the latter in engagement with the buffing or brushing means 46. This stock engaging means comprises a rotatable assembly 62 of individually radially movable elements adapted to take positions conforming with the surface of the tread stock and is preferably constructed of a plurality of spaced disks with enlarged circular openings supported upon a transversely extending shaft 63 with the disks spaced from each other by collars in the same manner as has been described in detail for the assembly 36. The assembly 62 is supported upon the frame 10 for movement to and from cooperation with the tread stock by having the shaft 63 carried by the ends of arms 64 and 65 that are pivotally supported upon the pillars or posts 11 which support the brushing means 46. Actuation of the assembly 62 to and from operative position is effected by a fluid pressure operated mechanism comprising adjustable length thrust members 66 acting between each of the arms 64, 65 and pistons 67, 67a, respectively, which are operatively disposed in cylinders 68 and 68a located on opposite sides of the frame at locations substantially vertically beneath the arms 64 and 65.

The tread stock which is to be buffed is moved through the machine by power driven means acting independently of the impetus imparted to the stock by contact thereof with the brushing means. In the illustrated embodiment of the apparatus the stock moving means includes a driven roll 69 rotatably supported upon suitable bracket or frame members 70 located on the entrance side of the brushing means 18, that is, to the left thereof as seen in Fig. 1. The surface of this roll may be roughened as by chasing, knurling, or the like, to facilitate driving engagement with the tread stock as the latter is presented thereto from the supporting surface provided by the rollers 17. Power for rotation of the roll 69 is derived from an electric motor and speed reduction mechanism 71, the output shaft of which is provided with a sprocket 72 carrying a chain 73, which is trained over a sprocket 74 on the shaft of the roll 69.

A roll 75 is rotatably supported above the roll 69 by means of a pair of arms 76 and 77 which are pivoted to the frame posts or pillars 11 by a shaft 78 which extends between the pillars intermediate the shafts 25 and 42. The roll 75 is therefore free to rest upon the top surface of the tread stock TS passing between roll 75 and the roll 69 with the weight of the roll 75 insuring firm contact of the stock with the roll 69. Roll 75 is also positively driven in a manner about to be described.

The apparatus is provided with a second stock driving means positioned between the brushing means 46 and the supporting means 15 upon which the tread stock emerges from the apparatus. This driving means comprises a roll 79 supported upon brackets such as 80 connected with the posts or pillars 11 which support the brushing means 46. This roll 79 is driven from the motor and speed reduction mechanism 71 by a flexible drive including chain means 81 passing about a sprocket 72a on the mechanism and a sprocket 82 that is secured to the shaft of the roll 79. Vertically above roll 79 is a cooperating roll 83 which is supported for movement towards and from the roll 79 by means of arms 84 and 85 that are pivoted to the frame 10 in the same manner as that described for the arms 76 and 77. The roll 83 is provided with a pulley 86 that is connected by a belt 87 with a pulley 88 on the roll 69. In a similar manner the roll 79 is provided with a pulley 89 about which is trained a belt 89a that passes around a pulley 90 connected with the roll 75.

The diameters of the several sprockets 72, 72a, 74 and 82 and the pulleys 86, 88, 89 and 90 are such that the rolls 69 and 75 rotate at the same speed. Likewise, the rolls 79 and 83 rotate at the same speed which speed is, however, preferably slightly greater than the speed of the rolls 69 and 75. By way of example, but without limitation thereto, the speed of the rolls 69 and 75 may be such that tread stock is moved therebetween at a rate in the order of fifteen feet per minute whereas the rolls 79 and 83 will move the tread stock at a rate of speed in the order of sixteen and one-half feet per minute. The rolls 79, 83 are so spaced from the rolls 69, 75 that the leading edge of the tread stock enters between the rolls 79, 83 before the trailing edge of the stock leaves the rolls 69, 75. Hence, the higher speed of rolls 79, 83 acts to prevent bunching or buckling of the stock adjacent the rear portion thereof due to the impetus imparted thereto by the brushing means 18 after the trailing edge of the stock has left the rolls 69, 75. Also this greater speed of the exit drive rolls 79, 83 relative to the speed of the entrance rolls 69, 75 provides a slight stretching of the stock while the latter is engaged by both sets of rolls, which stretching facilitates the brushing or buffing action but does not result in permanent elongation of the stock since the stretching is well within the elastic limit.

As mentioned heretofore, the buffing or brushing means 18 and 46 are rendered effective to initiate a brushing operation in response to presence of the stock adjacent the buffing means. In accordance with this invention this is effected by contact of the stock with the means for effecting movement thereof through the apparatus. For this purpose a first electrical switch LS1 is mounted on the frame 10 adjacent one of the arms, such as 76, which supports the roll 75, with the switch operating member 91 resting on the arm. Hence, when tread stock TS entering the machine is engaged with the rolls 69 and 75, the latter begin the positive forward feeding movement of the stock and, in addition, the roll 75 is rocked upwardly by an amount equal to the thickness of the stock thereby causing the switch operator 91 to actuate switch LS1. A second electrical switch LS2 is mounted on the frame 10 of the apparatus adjacent one of the arms, such as 84, which support the roll 83, with the operating member 92 of the switch engaging that arm. Hence, when the leading edge of the tread stock enters between the rolls 79 and 83 upward rocking of the roll 83 results in actuation of switch LS2. It will be understood that the belts 87 and 89a have sufficient slack or stretch to permit the slight change in length thereof occasioned by the rocking movement of the arms 76 and 84.

The manner in which the switches LS1 and LS2 operate to control the apparatus will be apparent from Fig. 4 which is a simplified schematic representation of the control mechanism for the apparatus. As shown therein, three phase alternating electrical energy is supplied to the apparatus from power lines L1, L2 and L3 which are connectible to the main wires 93, 94, and 95 by a disconnect switch 96. The wires 93 and 95 are connected to the primary 97 of a transformer T, the secondary 98 of which transformer is connected to the main wires 99 and 100 for the low voltage portion of the control circuit. Between the wires 99 and 100 is connected a circuit for controlling operation of the motors 31, 51 and 71. This circuit comprises a normally closed stop switch 101 and a normally open start switch 102 connected in series between the wire 99 and one terminal of a motor starter relay 1MS, the other terminal of this relay being connected with the wire 100. The circuit is such that momentary closing of the switch 102 energizes the motor starter 1MS thereby moving its contacts 1MS1, 1MS2, 1MS3 and 1MS4 to circuit closing position. Closing of the contacts 1MS1, 1MS2 and 1MS3 complete a circuit from the wires 93, 94 and 95 to the motor and speed reduction unit 71 thus starting the latter so that the stock moving rolls 69, 75 and 79, 83 begin to rotate. Closing of the contact 1MS4 completes a circuit connected in parallel with the switch 102 thus providing a holding circuit for the starter relay 1MS so that the latter remains energized when the switch 102 is released.

Connected in parallel with the motor starter relay 1MS are motor starter relays 2MS and 3MS. Consequently, the operation of the switch 102 also simultaneously energizes the motor starter relays 2MS and 3MS thus closing the contacts 2MS1, 2MS2, 2MS3 and 3MS1, 3MS2 and 3MS3. These contacts, respectively, connect motors 51 and 31 to the power wires 93, 94 and 95 so that the brushing means 18 and 46 begin to rotate. At this time, however, it will be understood that both of the brushing or buffing means are in their lower or non-operating positions similar to that shown in Fig. 1 for the brushing means 46.

In utilizing the apparatus, the operator places a slab or piece of tread stock TS upon the supporting means 14 with the surface which is to be buffed resting upon the rollers 17. If the motors 31, 51 and 71 have not yet been placed in operation he then momentarily actuates the button 102 which completes the circuit, previously described, energizing the motor starters 1MS, 2MS and 3MS thereby starting the motors 31, 51 and 71. The operator then moves the stock forwardly until the forward edge engages the rolls 75 and 69 whereupon the rolls drive or move the stock towards the buffing or brushing means 18 which is still in its lower position. As the stock passes beneath the roll 75 the arms 76 and 77 supporting the roll are rocked upwardly thereby moving the switch operator 91 of the switch LS1. This movement of the actuator 91 causes the movable contact of the switch LS1 to move to circuit closing position thus completing a circuit through the latter from wire 99 to one terminal of a solenoid SV1. The other terminal of the solenoid is connected with the wire 100 and hence the solenoid is energized.

The solenoid SV1 is provided with an armature 103 which is integral with, or attached to, a valve body 104 having a pair of spaced lands movable in the valve housing 105. The valve housing 105 is provided with an inlet conduit 106 through which fluid under pressure, such as compressed air or the like, is supplied from a suitable source not shown. The valve housing 105 is also provided with two outlet conduits 107 and 108. The outlet conduit 107 of the valve is connected with the inlet ports adjacent the upper ends of the cylinders 27 and 27a. The conduit 107 is also connected with conduits 109 and 109a which extend to the inlet ports located adjacent the lower ends of the cylinders 43 and 43a. The conduit 108 is connected to the lower ports of the cylinder 27 and 27a that communicate with the interior of the latter beneath the pistons therein. The conduit 108 is also connected with a conduit 110 which communicates with the interior of the cylinders 43 and 43a in the regions above the pistons.

It will be apparent from the construction just described, that the energization of the solenoid SV1 moves the valve body 104 from the position shown in Fig. 4 to a lower position in which fluid pressure from the conduit 106 is placed in communication with the conduit 108, and hence with conduit 110, while communication of these conduits with the exhaust port 111 is terminated. Simultaneously, the valve body 104 terminates communication of the fluid pressure from the conduit 106 with the conduits 107, 109 and 109a and places these conduits in communication with an exhaust port 112 of the valve body 105. Therefore, fluid under pressure is supplied to cylinders 27 and 27a beneath the pistons therein causing them to move upwardly thus moving the brushing means 18 into cooperative relationship with the under surface of the tread stock TS as the forward edge emerges from between the driven rolls 69 and 75. Simultaneously, the weight means or assembly 36 is lowered into contact with the upper surface of the tread stock since fluid under pressure is supplied above the pistons in the cylinders 43 and 43a while the regions beneath the pistons are connected to exhaust. Consequently, the lower surface of the tread stock TS is buffed or brushed by the buffing means 18 as the stock is fed therepast by action of the driving rolls 69 and 75. During this operation the stock is maintained in engagement with the buffing or brushing means by the weight of the assembly 36, the construction of which is such as to permit individual movement of the disk members so as to conform with the shape of the upper surface of the stock without deforming or deflecting the latter.

As the forward or leading edge of the tread stock TS begins to pass between the rolls 79 and 83, the latter is rocked upwardly thereby actuating the switch LS2 to circuit closing position. This completes a circuit through the switch to one terminal of a solenoid SV2, the other terminal of which is connected with the wire 100. The solenoid SV2 is provided with an armature 113 integral with or connected with the valve body 114 which is operable in a valve housing 115 identical in construction with the valve housing 105. The valve housing 115 is provided with a fluid pressure inlet means such as a conduit 116 connected with a suitable source of supply for fluid under pressure which may be the same source as is used for the conduit 106. The housing 115 is also provided with outlet conduits 117 and 118 which are connected with the cylinders 60, 60a and 68, 68a in the same manner that the several conduits connect the valve housing 105 to the cylinders 27 and 27a, 43 and 43a. Likewise, the valve housing 115 has exhaust ports 119 and 120 identical with the ports 111 and 112 of valve body 105. Hence, energization of the solenoid SV2, as the result of movement of switch LS2, supplied fluid under pressure to the cylinders 60 and 60a and 68 and 68a in a manner which moves the buffing or brushing means 46 upwardly into engagement with the tread stock and simultaneously allows the weight means 62 to be lowered into engagement with the upper surface of the tread stock. Consequently, this buffing or brushing means, like the buffing or brushing means 18, is moved to a position initiating its buffing or brushing action in response to the presence of tread stock adjacent thereto and does not require any action or attention upon the part of the operator.

In the preferred form of the apparatus, the buffing or brushing means 18 rotates in the direction of motion of the tread stock as indicated by the arrow applied thereto in Fig. 1 of the drawing. Consequently, the buffing action exerted upon the tread stock by means 18 tends to exert a force on the stock forwardly of the latter with the result that, as the trailing end of the stock moves from between the rolls 69 and 75, the impetus imparted by the brushing means 18 would tend to buckle, bunch, or otherwise distort the stock since the forward or intermediate portion of the stock would not receive this impetus at the same time. Furthermore, the buffing or brushing action adjacent the rear portion of the stock would not be as thorough or complete as in the other portions of the stock. These difficulties are eliminated in this apparatus by virtue of the movement of the brushing means 18 to its lower or non-operative position as soon as the trailing edge leaves the rolls 69, 75 and by the initiation of brushing action by the reversely rotating means 46 when the rear portion of the stock is adjacent thereto. The action of the buffing or brushing means 46 upon the stock counteracts any tendency of the free trailing end of the latter to buckle or distort and at the same time insures that this rear portion of the stock will be as thoroughly buffed or brushed as the forward or leading portion. Moreover, the somewhat greater speed of the driven rolls 79 and 83 relative to the speed of the rolls 69 and 75 further prevents any tendency of buckling or distortion of the tread stock and at the same time exerts a slight stretching of the stock so that the buffing or brushing action is more effective thereon.

It will be observed that, as the trailing end of the stock TS moves from beneath the roller 75, the latter moves downwardly under the weight of gravity thereby allowing the switch operator 91 to return to its initial position opening the circuit through switch LS1. The extent of the downward movement of the arms 76 and 77 supporting roll 75 may be limited, if desired, by suitable stops or abutments for the arms to prevent engagement of the rolls 69 and 75. The opening of switch LS1 de-energizes the solenoid SV1 with the result that the valve body 104 is returned, by a spring not shown, to the position illustrated in Fig. 4. This connects the conduits 108 and 110 with the exhaust port 111, terminates the communication of the conduits 107, 109 and 109a with the exhaust port 112 and places these latter conduits in communication with the fluid under pressure passing through the valve from the conduit 106. Consequently, the supporting arms for the brushing means 18 are moved to their lower positions while the supporting arms for the weight applying or stock engaging means or assembly 36 are moved to the upper position so that the brushing means 18 does not operate upon the stock after the trailing edge has left the rolls 69, 75. The brushing means 46 will, however, then be in operation since entrance of the leading edge of the stock between rolls 79, 83 will have operated switch LS2 to energize solenoid SV2 thereby moving valve body 114 to the position wherein fluid pressure is supplied for moving the brushing means 46 and weight means 62 to operative position. Hence, the brushing means 46 is operative to complete the brushing of the rear portion of the stock without buckling or bunching thereof, this operation being terminated when the trailing end of the stock passes from beneath the roll 83 allowing the latter to rock downwardly thus reopening the switch LS2 so that the solenoid SV2 is de-energized and the valve body 114 is moved back to the position shown in Fig. 4. This supplies fluid under pressure to the cylinders 60 and 60a and 68 and 68a so that the pistons thereof are restored to the positions illustrated in Fig. 4 thereby returning the buffing or brushing means 46 to its lower non-operative position and likewise elevating the stock engaging means 62. The several parts of the mechanism then remain in this condition until a new piece of stock is presented to the rolls 69 and 75 whereupon the apparatus automatically functions as before it being remembered that the motors 31, 51 and 71 remain energized whether or not stock is passing through the apparatus. Operation of the motors 31, 51 and 71 can readily be terminated by momentarily depressing the stop switch 101 thereby opening the holding circuit for the motor starters or relays 1MS, 2MS and 3MS so that the latter are de-energized thus opening the circuits to the motors, 31, 51 and 71.

Although the invention has been specifically disclosed with the reference to the embodiment thereof in the presently preferred form of the apparatus illustrated in the drawings, it will be apparent that numerous modifications can be made in the apparatus without departing from the principles of the invention. For example, in some instances the means for engaging the upper surface of the tread stock and maintaining the tread stock in engagement with the buffing or brushing means could be constructed other than as here shown and described and, in fact, in some cases may be made as to maintain a fixed position with respect to the frame of the apparatus throughout the operation thereof with only the buffing or brushing means being elevated and lowered in response to movement of the tread stock through the apparatus. Also, it will be apparent that means other than the switches LS1 and LS2 may be employed to control initiation and termination of the buffing operation, as for example, photo-electric control devices may be positioned for actuation by movement of the tread stock through the apparatus with the said controls governing the buffing operation. It will also be apparent that in some instances it may be desired not to move the buffing or brushing means from operative position but rather to simply control the buffing operation by starting and stopping the buffing means. These and other modifications and adaptations of the apparatus will be readily apparent to those skilled in the art to which the invention pertains and, consequently, the latter is not considered restricted to the specific details of construction and mode of operation here illustrated and described except as may be required by the spirit and scope of the appended claims.

Having thus described the invention, I claim:

1. An apparatus for buffing an elongated strip of tire tread stock comprising a first rotatable buffing means, means to move a piece of stock transversely of the axis of said buffing means, means to rotate said first buffing means in the direction of travel of said stock, means conforming to the surface of the stock on the side opposite said buffing means and engaging the stock to hold it against the buffing means, a second rotatable buffing means adjacent the first buffing means, a second means conforming to the surface of the stock on the side opposite the second buffing means and engaging the stock to hold it against the said second buffing means, means to rotate said second buffing means in the reverse direction to the direction of rotation of the first buffing means, means responsive to the presence of tread stock adjacent the first buffing means for initiating the buffing operation, and means responsive to the presence of a portion of the tread stock after it has passed said second buffing means for initiating buffing action by the latter independently of the buffing operation of the first buffing means, whereby the said buffing means act upon said tread stock to buff the entire length of the latter without injury to the end regions of the stock and without buckling of the latter.

2. An apparatus for buffing an elongated strip of tire tread stock comprising a frame, means on said frame adapted to support the stock in a substantially horizontal position, means to move the stock over said supporting means, a first rotatable buffing means supported on said frame for engagement with one side of the stock, means conformable to a non-planar surface of said stock movably supported in substantially vertical alignment with said buffing means for movement from an inactive position to a position in contact with said stock on the side thereof opposite said buffing means to maintain the stock in engagement with the buffing means during a buffing operation, a second rotatable buffing means supported on said frame for engagement with the stock on the said one side thereof, a second means conformable to a non-planar surface of said stock movably supported in substantially vertical alignment with said buffing means for movement from an inactive position to a position in contact with said stock on the side thereof opposite said second buffing means to maintain the stock in engagement with that buffing means during a buffing operation, separate power means operatively connected to the said conformable stock contacting means for positively moving the latter to and from engagement with the stock, and means responsive to movement of the stock into the vicinity of each of said buffing means operatively connected to said power means to individually actuate the latter.

3. An apparatus for buffing an elongated strip of tire tread stock comprising a first rotatable buffing means supported for movement to and from cooperation with tread stock, means conformable to a non-planar surface of said stock and supported in a position to engage the stock on the side thereof opposite said buffing means, means to move the stock transversely of the axis of said buffing means and between the latter and said conformable means, means responsive to the presence of the stock adjacent said buffing means and connected to the latter for moving it to operative position, a second rotatable buffing means adjacent the first-mentioned buffing means supported for movement to and from cooperation with tread stock, a second means conformable to a non-planar surface of said stock supported in a position to engage the stock on the side opposite the second buffing means, and means responsive to the presence of a portion of tread stock that has passed said second conformable and buffing means and operatively connected to the latter for movement thereof to cooperation with the piece of stock being moved by said moving means, the said means for moving the second buffing means being independent of the means for moving the first buffing means, whereby the said buffing means act upon said tread stock to buff the entire length of the latter.

4. An apparatus as defined in claim 3 wherein the said buffing means rotate in reverse directions.

5. An apparatus for buffing an elongated strip of tire tread stock comprising a first rotatable buffing means supported for movement to and from cooperation with tread stock, means responsive to the presence of the stock adjacent said buffing means and connected to the latter for moving it to operative position, a second rotatable buffing means adjacent the first mentioned buffing means supported for movement to and from cooperation with tread stock, means responsive to the presence of tread stock adjacent said second buffing means and operatively connected to the latter for movement thereof to and from cooperation with the piece of stock, and means to move the stock transversely of the axes of said buffing means including a first driven roll engaging the stock in advance of the said first buffing means, a second driven roll engaging the stock subsequent to contact of the stock with said second buffing means, and means to rotate said second roll at a greater peripheral speed than said first roll.

6. An apparatus for buffing an elongated strip of tire tread stock comprising a frame, means on said frame adapted to support the stock in substantially a horizontal position, means to move the stock over said supporting means, a first rotatable buffing means, means supporting said buffing means on said frame for movement to and from cooperation with one side of said stock, a rotatable assembly of a plurality of individually radially movable elements supported above said buffing means to engage said stock on the side opposite said buffing means and conform to the engaged surface of the stock to maintain the stock in engagement with the buffing means during a buffing operation, a second rotatable buffing means, means supporting said second buffing means on said frame for movement to and from cooperation with the tread stock on the said one side thereon, a rotatable assembly of a plurality of individually radially movable elements supported above said second buffing means adapted to contact said stock on the side opposite said second buffing means and conform to the engaged surface of the stock to maintain the stock in engagement with the said second buffing means during a buffing operation, and separate means for individually moving said buffing means to and from engagement with the tread stock, the said separate means each including means responsive to movement of the tread stock to a location adjacent a buffing means to actuate the corresponding moving means to buffing position only when stock is present at said location and from said position only when stock is not present at said location.

7. An apparatus for buffing an elongated strip of tire tread stock comprising a frame, means on said frame adapted to support the stock in substantially a horizontal position, means to move the stock over said supporting means, a first rotatable buffing means, means supporting said buffing means on said frame for movement to and from cooperation with one side of said stock, means adapted to engage said stock on the side opposite said buffing means and conform to the engaged surface of the stock, a second rotatable buffing means, means supporting said second buffing means on said frame for movement to and from cooperation with the tread stock on the said one side thereof, means adapted to contact said stock on the side opposite said second buffing means and conform to the engaged surface of the stock, means for simultaneously moving said first buffing means and stock contacting means toward each other into engagement with the stock, means responsive to movement of tread stock over said supporting means to a location adjacent said first buffing means to actuate the said means for moving the first buffing and stock engaging means from an initial spaced relationship to stock engaging relationship and to effect return of the said buffing and stock engaging means to said initial relationship when there is no stock adjacent said first buffing means, means independent of the first-mentioned buffing and stock engaging means operative to move said second buffing means and said second stock engaging means simultaneously toward each other into engagement with the stock, and means responsive to movement of the stock over said supporting means and to a position adjacent said second buffing means for actuating said last-mentioned moving means from an initial spaced relationship to stock engaging relationship and to effect return of the said buffing and stock engaging means to said initial relationship when there is no stock adjacent said second buffing means.

8. An apparatus as defined in claim 7 wherein the said means for moving each of the tread buffing and contacting means are separate fluid pressure operated mechanisms, and the said means responsive to movement of the stock are electrical switch means each operatively connected to control the application of fluid pressure to the corresponding fluid pressure operated mechanisms.

9. An apparatus as defined in claim 7 wherein said buffing means are rotatable brushes rotating in opposite directions.

10. An apparatus as defined in claim 7 wherein the said stock contacting means each comprise a plurality of discs with central openings supported in spaced relationship upon a shaft of smaller diameter than the said openings whereby the discs are free to individually move radially to permit their peripheries to conform with a non-planar surface on said tread stock.

References Cited in the file of this patent

UNITED STATES PATENTS

| Number | Name | Date |
|---|---|---|
| 187,323 | Shaw et al. | Feb. 13, 1877 |
| 1,463,801 | Cosgrove et al. | Aug. 7, 1923 |
| 1,521,582 | Stevens | Dec. 30, 1924 |
| 1,588,342 | Stevens et al. | June 8, 1926 |
| 1,612,990 | Silverstein et al. | Jan. 4, 1927 |
| 2,095,697 | Hammer | Oct. 12, 1937 |
| 2,220,982 | Toney | Nov. 12, 1940 |
| 2,371,948 | Bergmann | Mar. 20, 1945 |
| 2,453,339 | Peterson | Nov. 9, 1948 |
| 2,537,675 | Klein | Jan. 9, 1951 |